US008486286B1

(12) United States Patent  
Gao et al.

(10) Patent No.: US 8,486,286 B1
(45) Date of Patent: Jul. 16, 2013

(54) METHOD AND SYSTEM FOR PROVIDING AN ENERGY ASSISTED MAGNETIC RECORDING WRITER HAVING AN INTEGRATED NFT, HEAT SINK, AND POLE

(75) Inventors: Wei Gao, Fremont, CA (US); Shing Lee, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 164 days.

(21) Appl. No.: 12/975,184

(22) Filed: Dec. 21, 2010

(51) Int. Cl.
*B44C 1/22* (2006.01)
*G11B 5/127* (2006.01)

(52) U.S. Cl.
USPC ............. 216/22; 216/41; 216/83; 29/603.16; 250/492.3

(58) Field of Classification Search
USPC ............ 216/22, 41, 83; 29/603.16; 250/492.3
See application file for complete search history.

(56) References Cited

U.S. PATENT DOCUMENTS

| 4,667,395 | A | 5/1987 | Ahlgren |
|---|---|---|---|
| 5,994,747 | A | 11/1999 | Wu |
| 6,746,877 | B1 | 6/2004 | Hornik |
| 6,795,630 | B2 | 9/2004 | Challener |
| 7,272,079 | B2 | 9/2007 | Challener |
| 7,500,255 | B2 | 3/2009 | Seigler |
| 7,791,839 | B2 | 9/2010 | Olson et al. |
| 7,965,464 | B2 | 6/2011 | Batra et al. |
| 8,024,748 | B1 | 9/2011 | Moravec et al. |
| 8,134,794 | B1 | 3/2012 | Wang |
| 8,164,855 | B1 | 4/2012 | Gibbons et al. |
| 8,248,891 | B2 | 8/2012 | Lee et al. |
| 8,286,329 | B1 | 10/2012 | Zhao et al. |
| 8,307,540 | B1 * | 11/2012 | Tran et al. .................. 29/603.16 |
| 8,310,901 | B1 * | 11/2012 | Batra et al. ................. 369/13.33 |
| 8,375,565 | B2 | 2/2013 | Hu et al. |
| 8,391,108 | B2 | 3/2013 | Peng et al. |
| 2003/0137772 | A1 | 7/2003 | Challener |
| 2008/0068748 | A1 | 3/2008 | Olson |
| 2010/0104768 | A1 | 4/2010 | Xiao |
| 2010/0123965 | A1 | 5/2010 | Lee |
| 2010/0123967 | A1 | 5/2010 | Batra |
| 2010/0214685 | A1 | 8/2010 | Seigler et al. |
| 2011/0090588 | A1 | 4/2011 | Gao et al. |

OTHER PUBLICATIONS

Zhongyan Wang, et al., "An approach for nanometer trench and hole formation", Optical Microlithography XXI, Proceedings of the SPIE, vol. 6924, pp. 692447-692447-8 (2008).

* cited by examiner

*Primary Examiner* — Shamim Ahmed (57) ABSTRACT

A method and system for providing an energy assisted magnetic recording (EAMR) transducer coupled with a laser are described. The laser provides energy. The EAMR transducer has an air-bearing surface (ABS) configured to reside in proximity to a media during use. The EAMR transducer includes a near field transducer (NFT) proximate to the ABS for focusing the energy onto the region of the media. The method and system include providing a heat sink having a bottom thermally coupled with the NFT and a top surface at an angle with respect to the ABS. The angle is greater than zero and less than ninety degrees. The method and system also include providing a write pole and at least one coil. The write pole is configured to write to a region of the media. The write pole has a bottom surface thermally coupled with the top surface of the heat sink. The at least one coil is for energizing 24.

16 Claims, 12 Drawing Sheets

METHOD AND SYSTEM FOR PROVIDING AN ENERGY ASSISTED MAGNETIC RECORDING WRITER HAVING AN INTEGRATED NFT, HEAT SINK, AND POLE

BACKGROUND

Figure 1:
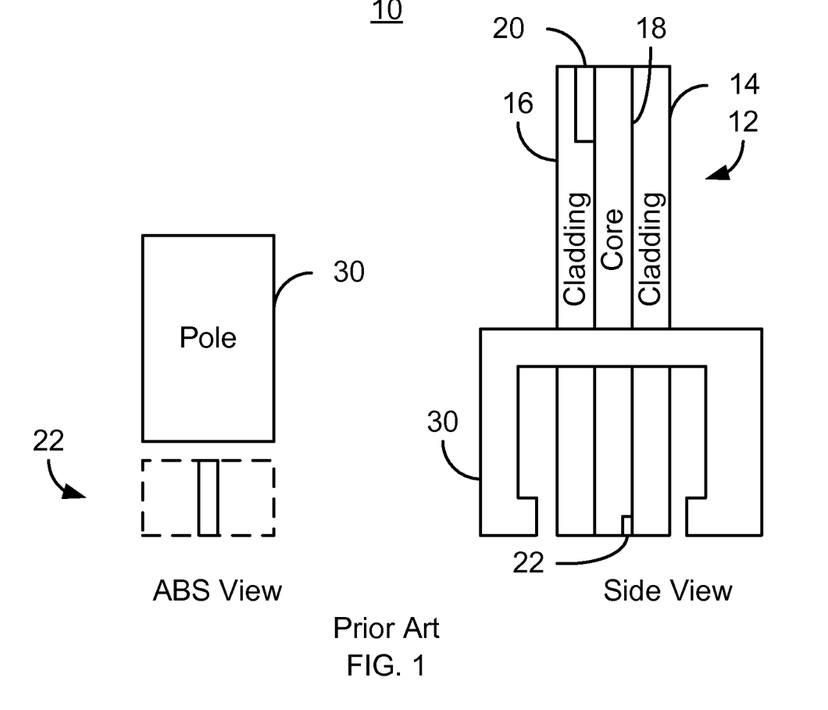
FIG. 1 is a diagram depicting a conventional EAMR transducer.

FIG. 1 depicts top and side views of a portion of a conventional energy assisted magnetic recording (EAMR) transducer 10. For clarity, FIG. 1 is not to scale. The conventional EAMR transducer 10 is used in writing a recording media (not shown in FIG. 1) and receives light, or energy, from a conventional laser (not shown in FIG. 1). The conventional EAMR transducer 10 includes a conventional waveguide 12 having cladding 14 and 16 and core 18, a conventional grating 20, a conventional near-field transducer (NFT) 22, and a conventional pole 30. Light from a laser (not shown) is incident on the grating 20, which coupled light to the waveguide 12. Light is guided by the conventional waveguide 12 to the NFT 22 near the air-bearing surface (ABS). The NFT 22 focuses the light to magnetic recording media (not shown), such as a disk.

In operation, light from the laser is coupled to the conventional EAMR transducer 10 using the grating 20. The waveguide 12 directs light from the grating 12 to the NFT 22. The NFT 22 focuses the light from the waveguide 12 and heats a small region of the conventional media (not shown). The conventional EAMR transducer 10 magnetically writes data to the heated region of the recording media by energizing the conventional pole 30.

Although the conventional EAMR transducer 10 may function, there are drawbacks. At current high recording densities, performance of the EAMR transducer 10 may degrade. In particular, the NFT 22 may absorb a significant amount of heat during operation. As a result, the conventional NFT 22 may degrade. In some instances, the conventional NFT 22 may be destroyed during use. Consequently, a mechanism for dissipating heat without adversely affecting performance of the EAMR head may be desired.

Accordingly, what is needed is a system and method for improving performance and reliability of an EAMR transducer.

BRIEF SUMMARY OF THE INVENTION

A method and system for providing an energy assisted magnetic recording (EAMR) transducer coupled with a laser are described. The laser provides energy. The EAMR transducer has an air-bearing surface (ABS) configured to reside in proximity to a media during use. The EAMR transducer includes a near field transducer (NFT) proximate to the ABS for focusing the energy onto the region of the media. The method and system include providing a heat sink having a bottom thermally coupled with the NFT and a top surface at an angle with respect to the ABS. The angle is greater than zero and less than ninety degrees. The method and system also include providing a write pole and at least one coil. The write pole is configured to write to a region of the media. The write pole has a bottom surface thermally coupled with the top surface of the heat sink. The at least one coil is for energizing the write pole.

DETAILED DESCRIPTION OF THE EMBODIMENTS OF THE INVENTION

Figure 2:
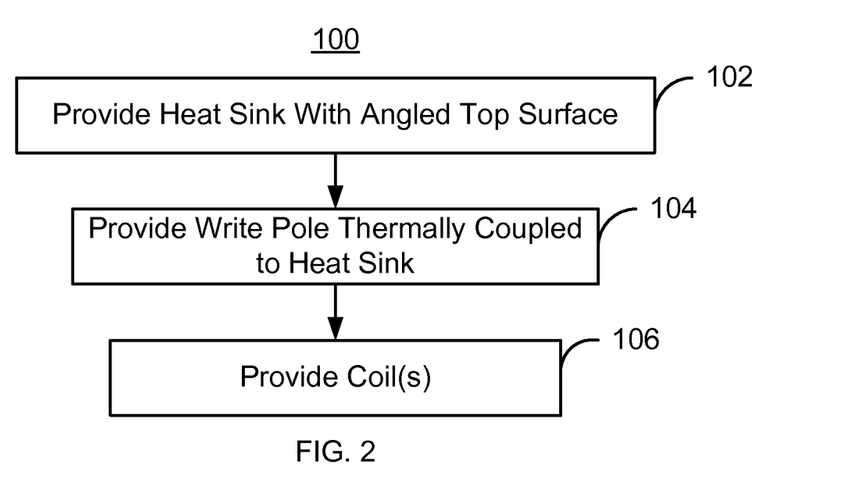
FIG. 2 is a flow chart depicting an exemplary embodiment of a method for fabricating an EAMR transducer including a heat sink.

FIG. 2 is a flow chart depicting an exemplary embodiment of a method 100 for fabricating an EAMR transducer having a heat sink. For simplicity, some steps may be omitted and/or combined. The EAMR transducer being fabricated may be part of a merged head that also includes a read head (not shown) and resides on a slider (not shown) in a disk drive. The method 100 is also described in the context of providing a single EAMR transducer. However, the method 100 may be used to fabricate multiple transducers at substantially the same time. The method 100 and system are also described in the context of particular layers. However, in some embodiments, such layers may include multiple sub-layers. The method 100 also may commence after formation of other portions of the EAMR transducer. In one embodiment, the method 100 commences after formation of the NFT and an optical dielectric surrounding the sides of the NFT. In some embodiments, therefore, a flat surface for formation of subsequent structures has been provided.

A heat sink having a bottom thermally coupled with the NFT is provided, via step 102. In some embodiments, the heat sink adjoins the NFT. Step 102 also includes ensuring that the top surface of the heat sink is at an angle with respect to the ABS. This angle is greater than zero and less than ninety degrees. The slope is such that the portion of the heat sink closest to the ABS is shortest. In some embodiments, the entire top surface of the heat sink is sloped. In some embodiments, the height of the heat sink is not more than approximately one hundred fifty nanometers. in some embodiments, the diameter of the heat sink is also not more than approximately one hundred fifty nanometers. However, in some embodiments, a portion of the heat sink may not be sloped and instead be perpendicular to the ABS.

A write pole is also provided, via step 104. The write pole is configured to write to a region of the media. The write pole has a bottom surface that is thermally coupled with the top surface of the heat sink. In some embodiments, the write pole is provided in step 104 such that a portion of the bottom surface adjoins the top surface of the heat sink. Thus, at least part of the bottom surface of the write pole may be sloped at the same angle as the top surface of the heat sink.

At least one coil for energizing the write pole is provided, via step 106. Fabrication of the EAMR transducer may then be completed. For example, shields and/or other structures may be fabricated.

Figure 3:
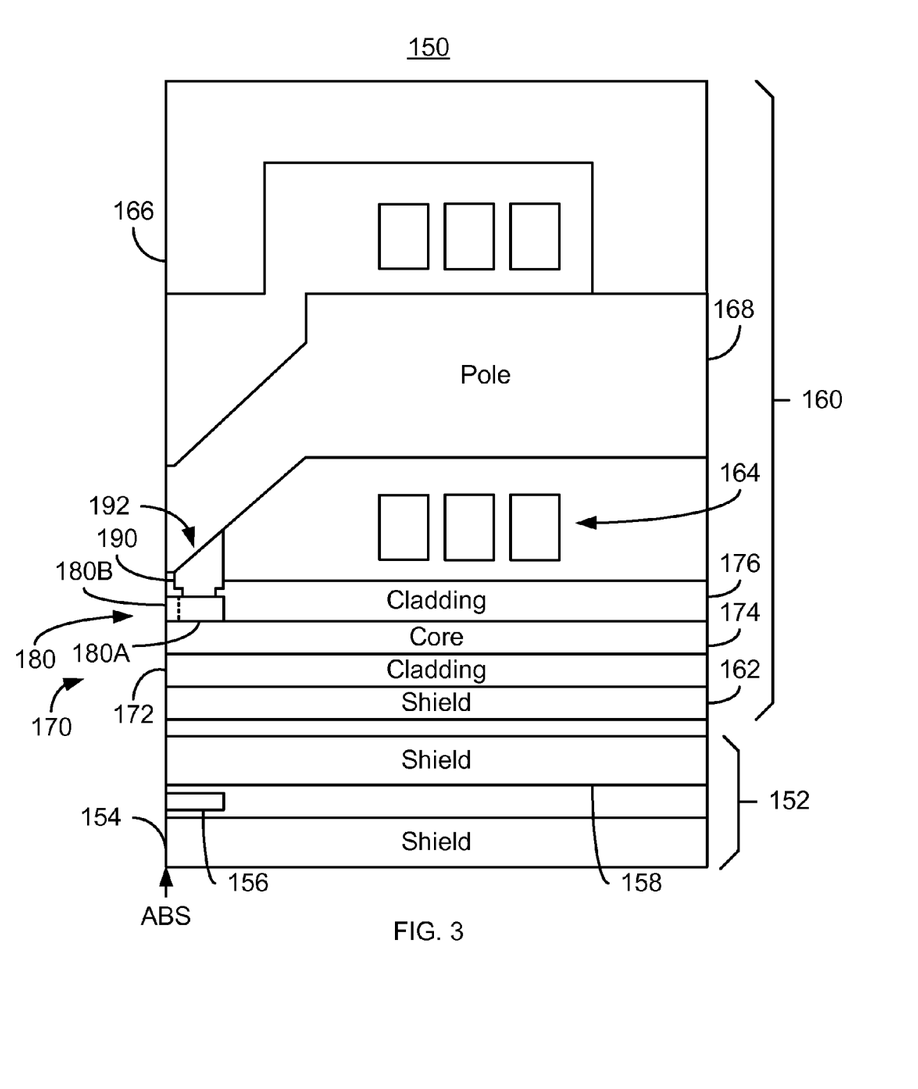
FIG. 3 is a diagram depicting an exemplary embodiment of an EAMR head.

FIG. 3 depicts one embodiment of an EAMR head 150 fabricated using the method 100. For clarity, FIG. 4 is not to scale. For simplicity not all portions of the EAMR head 150 are shown. In addition, although the EAMR head 150 is depicted in the context of particular components other and/or different components may be used. Further, the arrangement of components may vary in different embodiments. The EAMR head 150 may be used in an EAMR disk drive. The EAMR head 150 includes a read transducer 152 and a write transducer 160. The read transducer 152 includes shields 154 and 158 and reader sensor 156. In some embodiment, the read sensor 156 may be a giant magnetoresistance sensor, such as a spin tunneling junction. However, in other embodiments, another sensor may be used.

The EAMR transducer 160 includes waveguide 170, NFT 180, write pole 168, return pole 166, coil(s) 164, and shield 162. The EAMR transducer 160 may also include a grating (not shown) that is used to couple light from the laser (not shown) to the waveguide 170. The coil(s) 164 may be used to energize the write pole 140 during writing.

The waveguide 170 directs energy from the laser to the ABS and more specifically to the NFT 180. The waveguide 170 includes cladding 172 and 176 as well as core 174. The NFT 180 is optically coupled with the waveguide 170, receiving energy from the core 174. The NFT 180 is proximate to the ABS. For example, the NFT 180 is shown as having a surface occupying a portion of the ABS. The NFT 180 focuses energy from the waveguide 170 onto a region of the media (not shown). In some embodiments, the NFT 180 includes a disk 180A and a pin 180B. The pin 180B is between the disk 180A and the ABS. Thus, the disk 180A is recessed from the ABS and thus is shown by a dashed line in the ABS view of FIG. 3. The disk 180A extends further in the track width direction (perpendicular to the plane of the page in FIG. 3) than the pin 180B. Although termed a disk, the disk 180A of the NFT 180 need not be disk-shaped. For example, instead of having a circular footprint, the disk 180A may be square, rectangular, or have another shape.

The write pole 168 is configured to write to the region of the media heated by the NFT 180. In the embodiment shown, a portion of the bottom surface of the pole 168 proximate to the ABS is parallel to the top surface of the NFT 180. In some embodiments, this portion of the bottom surface of the pole 168 may be omitted. Another portion of the bottom surface of the pole 168 slopes away from the NFT 180.

The heat sink 190 is thermally coupled at its bottom with the NFT 180 and at its top with the bottom surface of the pole 168. The heat sink 190 has a top surface 192 that is sloped. In some embodiments, the heat sink 190 has the same footprint as the disk portion of the NFT 180. In some embodiments, therefore, the heat sink 190 may have a cylindrical cross-section. In general, the width of the heat sink is smaller than that of the NFT 180.

Using the method 100, the heat sink 190 can be provided in the EAMR transducer 150. The heat sink 190 allows for heat to be carried away from the NFT 180. The method 100 also provides the heat sink 190 without damaging the NFT 180. Consequently, performance of the NFT 180 may be improved. Because the heat sink 180 and thus the pole 190 are sloped, a separation between the magnetic and optical components may be maintained. Thus, performance of the EAMR transducer 150 may be enhanced.

Figure 4:
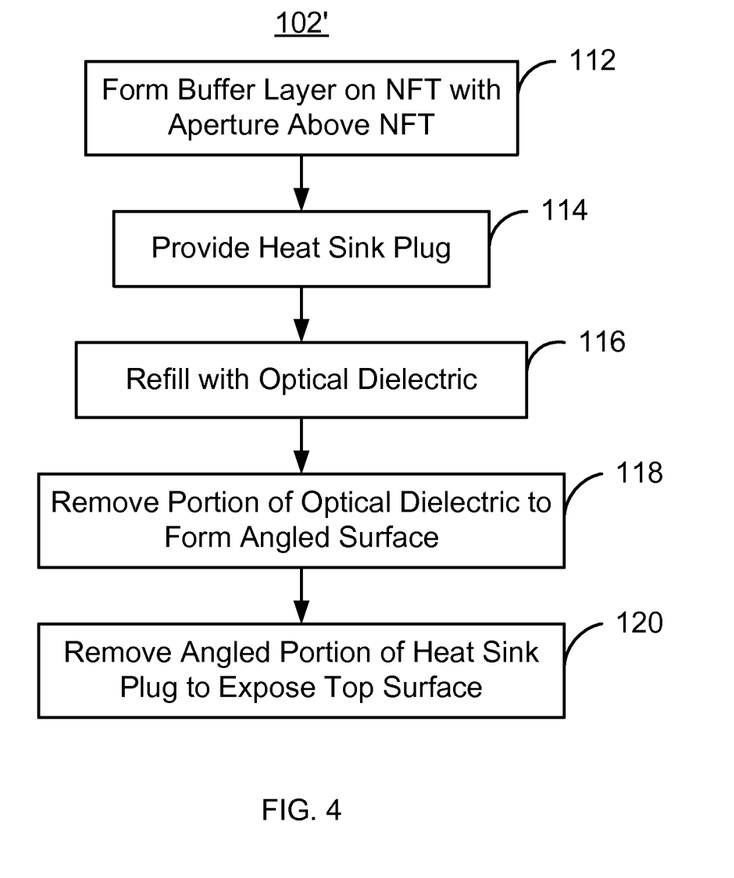
FIG. 4 is a flow chart depicting an exemplary embodiment of a method for providing a heat sink in an EAMR transducer.

FIG. 4 is a flow chart depicting an exemplary embodiment of a method 102' for fabricating a heat sink in an EAMR transducer. For simplicity, some steps may be omitted and/or combined. The method 102' is also described in the context of providing a single heat sink. However, the method 102' may be used to fabricate multiple heat sinks at substantially the same time. The method 102' and system are also described in the context of particular layers. However, in some embodiments, such layers may include multiple sub-layers. The method 102' also may commence after formation of other portions of the EAMR transducer in which the heat sink resides. In one embodiment, the method 102' commences after formation of the NFT and an optical dielectric surrounding the sides of the NFT. In some embodiments, therefore, a flat surface for formation of subsequent structures has been provided. For clarity, the method 102' is described in the context of the EAMR transducer 100. However, in other embodiments, the method 102' may be used in forming another device.

A buffer layer is provided, via step 112. The buffer layer is provided on the NFT 180 and has an aperture therein above a portion of the NFT 180. The buffer layer may include materials such as Cr and/or NiFe and is typically thin, on the order of sixty nanometers or less. In some embodiments, the stop layer is composed of one of Cr and NiFe. Although the aperture is above the NFT, the aperture only exposes a portion of the NFT. In some embodiments, part of the disk portion 180A of the NFT 180 is exposed. The aperture in the buffer layer may be formed by providing a mask on the disk portion 180A of the NFT 180. The mask may be a photoresist post. The buffer layer is then deposited and an ion mill performed at a nonzero angle from the top of the NFT. The ion mill may open a hole in the portion of the buffer layer on the sidewalls of the mask. The mask may then be lifted off, forming the aperture.

A heat sink plug is provided, via step 114. A portion of the heat sink plug is above the aperture. The heat sink plug also has sidewalls that are reentrant or substantially vertical. Thus, the bottom of the heat sink plug may be smaller in width, depth, and/or diameter than the top of the head sink plug. In some embodiments, step 114 is performed by depositing a layer of high thermal conductivity material, such as Au and/or Cu. A portion of the high thermal conductivity material is covered by a mask and the remaining portion removed. In some embodiments, the mask is a hard mask. The mask has a footprint that is wider than the aperture. Thus, the portion of the heat sink above the aperture may have a width, depth, and/or diameter greater than the aperture. Stated, differently, a neck may be formed in the heat sink. The removal process may include milling the high thermal conductivity material. The milling stops at or in the buffer layer. A portion of the heat sink resides in the aperture of the buffer layer.

The transducer is refilled with an optical dielectric layer, via step 116. The optical dielectric layer covers the heat sink plug and the NFT 180. An angle in the optical dielectric layer such that a first portion of the optical dielectric layer closer to the ABS is thinner than a second portion of the optical dielectric layer distal from the ABS, via step 118. A portion of the heat sink plug is removed to expose the top surface of the heat sink, via step 120. In some embodiments, step 120 includes milling the heat sink plug at a milling angle that corresponds to the angle of the top surface. Thus, the angled top surface 192 of the heat sink 190 is formed.

Thus, using the method 102', the heat sink 190 may be formed. As a result, the benefits of the method 100 and head 150 may be attained.

Figure 5:
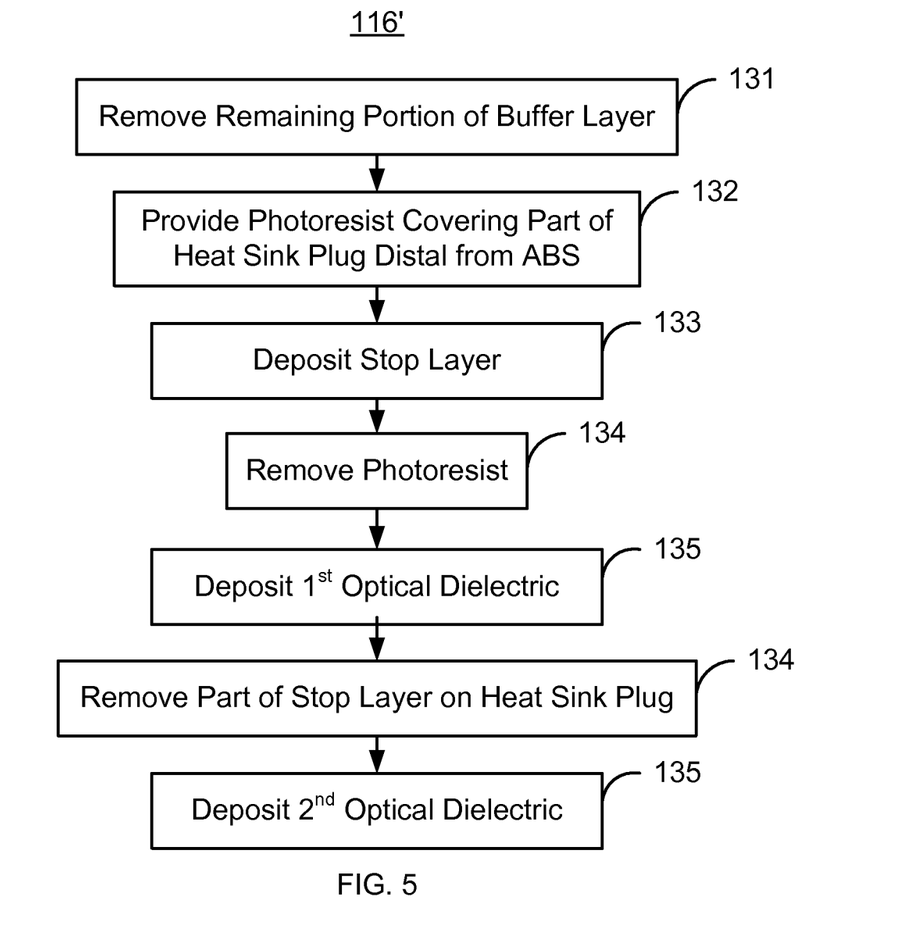
FIG. 5 is a flow chart depicting an exemplary embodiment of a method for refilling with an optical dielectric.

FIG. 5 is a flow chart depicting an exemplary embodiment of a method 116' for fabricating refilling with an optical dielectric during fabrication of a heat sink in an EAMR transducer. For simplicity, some steps may be omitted and/or combined. For clarity, the method 116' is described in the context of the EAMR transducer 100. The method 116' may thus be used in the method 102'. Consequently the method 116' may also be used in the method 100. The method 116' is also described in the context of providing a single heat sink. However, the method 116' may be used to fabricate multiple heat sinks at substantially the same time. The method 116' and system are also described in the context of particular layers.

However, in some embodiments, such layers may include multiple sub-layers. The method 116' also may commence after formation of other portions of the EAMR transducer in which the heat sink resides. In one embodiment, the method 116' commences after formation of the NFT 180, any optical dielectric surrounding the sides of the NFT 180, and the heat sink plug. However, in other embodiments, the method 102' may be used in forming another device.

The remainder of the buffer layer provided in the method 102' is removed, via step 131. In some embodiments, step 131 includes wet etching the buffer layer. A photoresist layer covering a portion of the heat sink plug distal from the ABS is provided, via step 132. A stop layer is deposited, via step 133. In some embodiments, the stop layer includes at least one of Cr, Ru, and NiFe. In some embodiments, the stop layer is composed of one of Cr, Ru, and NiFe. Thus, the stop layer covers a portion of the NFT near the ABS, the exposed portion of the heat sink plug near the ABS, and the photoresist layer.

The photoresist layer is removed, via step 134. Step 134 may include stripping the photoresist. Consequently, the remaining portion of the stop layer covers the portion of the heat sink plug proximate to the ABS and the NFT 180. A first optical dielectric material is deposited, via step 134. In some embodiments, this optical dielectric material includes at least one of aluminum oxide, silicon oxide, GaN, and BeO. In some embodiments, the optical dielectric material includes only one of aluminum oxide, silicon oxide, GaN, and BeO. This first optical dielectric material does not cover the heat sink plug. The portion of the stop layer on the heat sink plug is removed, via step 134. In addition, any remaining hard mask on the heat sink plug may be removed. A second optical dielectric material is deposited, via step 135. In some embodiments, this optical dielectric material includes at least one of aluminum oxide, silicon oxide, GaN, and BeO. In some embodiments, the second optical dielectric material includes only one of aluminum oxide, silicon oxide, GaN, and BeO. This second optical dielectric covers the heat sink plug. The method 102' and, therefore, 100', may then continue to provide the heat sink 190 having the sloped surface.

Figure 6:
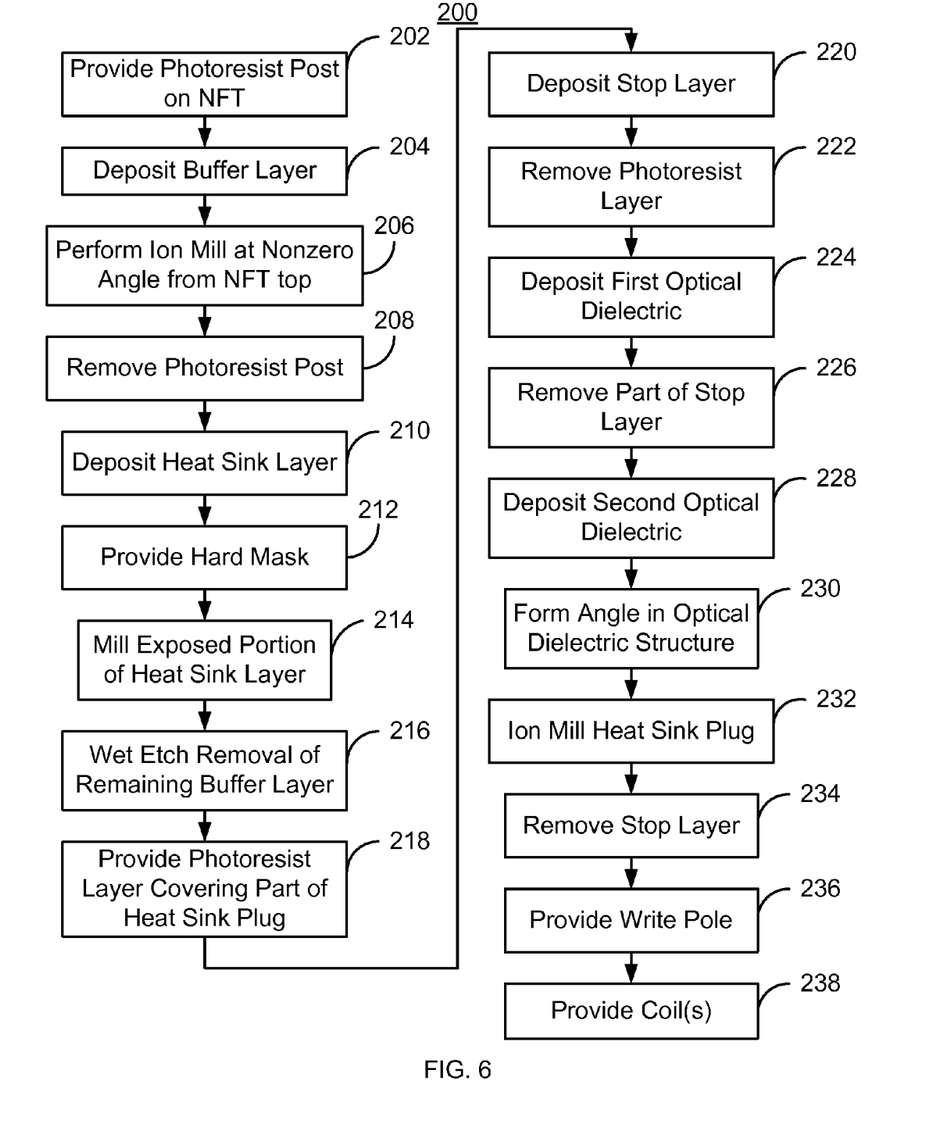
FIG. 6 is a flow chart depicting another exemplary embodiment of a method for providing a heat sink in an EAMR transducer.

FIG. 6 is a flow chart depicting another exemplary embodiment of a method 200 for fabricating a PMR transducer. For simplicity, some steps may be omitted. FIGS. 7-20 are diagrams depicting side views of an exemplary embodiment of a portion of an EAMR transducer during 250 fabrication. For clarity, FIGS. 7-20 are not to scale. Further, although FIGS. 7-20 depict the ABS location (location at which the ABS is to be formed) and ABS at a particular point in the pole, other embodiments may have other locations for the ABS. Referring to FIGS. 6-20, the method 200 is described in the context of the EAMR transducer 250. However, the method 200 may be used to form another device (not shown). The EAMR transducer 250 being fabricated may be part of a merged head that also includes a read head (not shown in FIGS. 7-20), a laser (not shown in FIGS. 7-20) and resides on a slider (not shown) in a disk drive. In addition, other portions of the EAMR transducer 250, such as the pole(s), shield(s), coil(s), and remaining optics are not shown. The method 200 also may commence after formation of other portions of the EAMR transducer 250. For example, an NFT and portion of the cladding layer have already been fabricated. The method 200 is also described in the context of providing a single EAMR transducer 250. However, the method 200 may be used to fabricate multiple transducers at substantially the same time. The method 200 and device 250 are also described in the context of particular layers. However, in some embodiments, such layers may include multiple sublayers.

Figure 7:
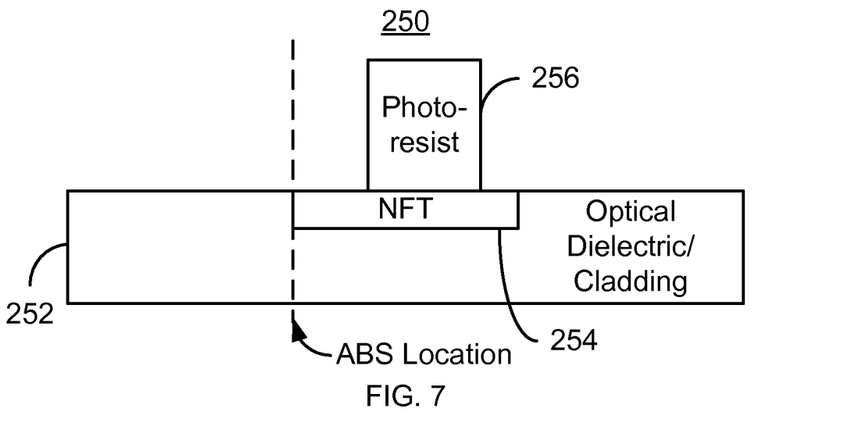
FIGS. 7-20 are diagrams depicting an exemplary embodiment of a magnetic recording transducer during fabrication.

A photoresist post is provided on the NFT, via step 202. FIG. 7 depicts the EAMR transducer 250 after step 202 is performed. Thus, photoresist post 256 is formed on the NFT 254. Also shown is cladding 252. In some embodiments, the photoresist post 256 is cylindrical and has a width that is somewhat smaller than the NFT 254. For example, in some embodiments, the NFT 254 is two hundred nanometers deep, including the pin and disk. In such embodiments, the photoresist post 256 might have a width not larger than one hundred eighty nanometers. However, in other embodiments, other widths and shapes may be used.

Figure 8:
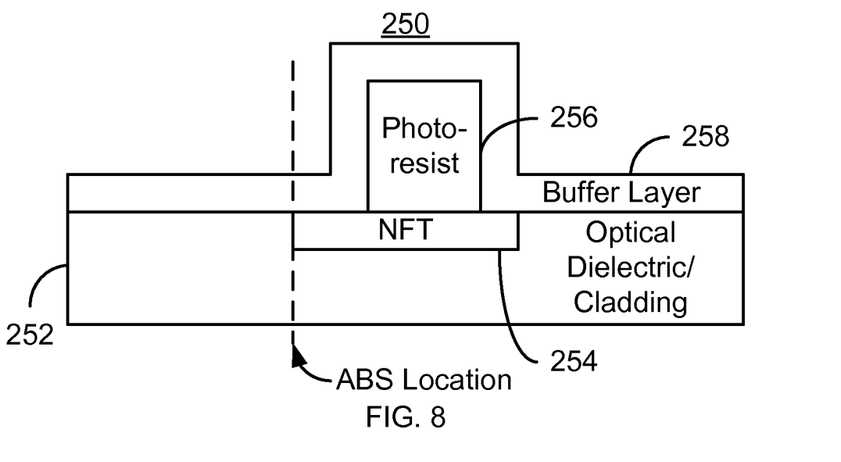

A buffer layer is deposited, via step 204. Step 204 may include blanket depositing a layer of Cr, Ru, and/or NiFe. The thickness of such a layer might be not more than sixty nanometers. FIG. 8 depicts the EAMR transducer 250 after step 204 is performed. Thus, a buffer layer 258 is shown. The buffer layer 258 covers the photoresist post 256 and an exposed portion of the NFT 254.

Figure 9:
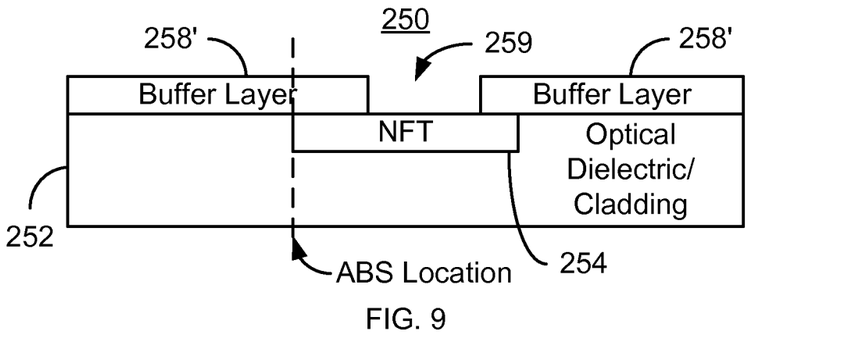

An ion mill is performed at a nonzero angle from the top of the NFT, via step 206. The ion mill is used to open an aperture in the portion of the buffer layer 258 on the sides of the photoresist post 256. As a result, an etchant is able to contact the photoresist post 256. The photoresist post 256 is then removed, via step 208. In some embodiments, step 208 is performed using a lift-off. As a result, an aperture is formed in the buffer layer 258. FIG. 9 depicts the EAMR transducer 250 after step 208 is performed. Consequently, aperture 259 is formed in buffer layer 258'. The aperture 259 resides over a portion of the NFT 254. In some embodiments, the aperture 259 resides above the disk portion (not separately shown) of the NFT 254. For clarity, the aperture 259 is only denoted on in FIG. 9.

Figure 10:
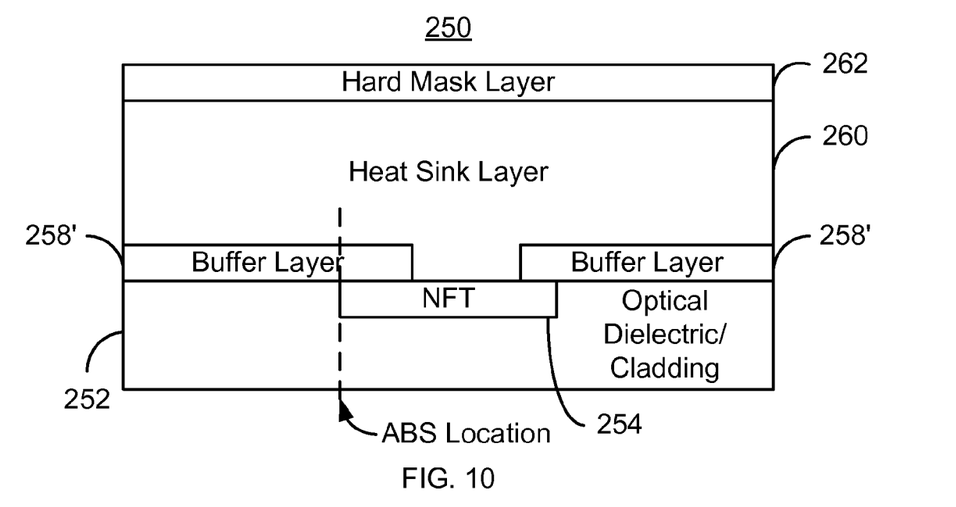
Figure 11:
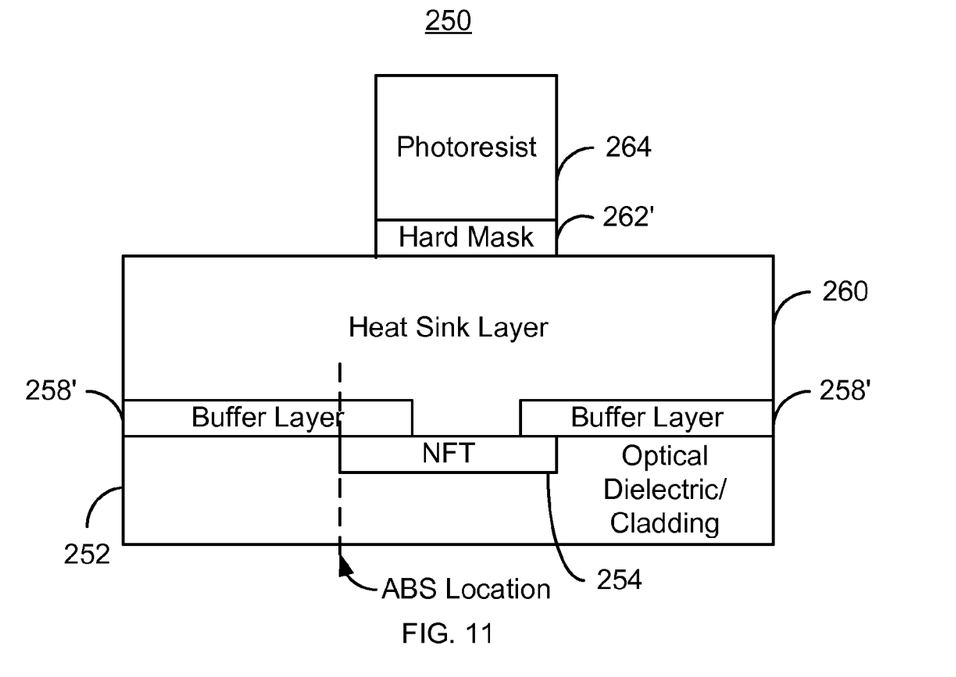

A heat sink layer is deposited, via step 210. In some embodiments, step 210 includes blanket depositing a layer of thermally conductive material such as gold and/or Cu. In some embodiments, a gold alloy may be used. The thickness of the heat sink layer may be up to one hundred fifty nanometers in some embodiments. Alternatively, a thicker layer might be used. A portion of the heat sink layer resides in the aperture 259. In addition, a hard mask is provided, via step 212. Step 212 includes depositing a hard mask layer. FIG. 10 depicts the EAMR transducer 250 during step 212. Thus, the heat sink layer 260 is shown. Also shown is a hard mask layer 262. The hard mask layer 262 may include materials such as NiFe, Cr, and/or SiC. In some embodiments, the hard mask layer 262 includes multiple sublayers. For example, up to 10 nm of NiFe or Cr covered by up to fifty nanometers of SiC might be used. The hard mask is formed by providing a photoresist mask on the hard mask layer 262 and removing an exposed portion of the hard mask layer 262. For example, a SiC reactive ion etch (RIE) or other appropriate process may be used. FIG. 11 depicts the EAMR transducer after step 212 is performed. Thus, the hard mask 262' has been formed. Also shown is photoresist mask 264. The photoresist mask may be a single layer or a multilayer. In some embodiments, the photoresist mask is at least as large as the disk portion of the NFT 254. The photoresist mask 264 and thus the hard mask 262' are generally desired to be larger than the aperture 259. However in other embodiments, the photoresist mask 264 and hard mask 262' may be the same size as or smaller than the aperture 259. In some embodiments, the lower layer of the hard mask layer 262, such as the NiFe or Cr layer remains after step 212. However, in such embodiments, the exposed portion of the lower layer would be removed in step 214, below. Any remaining portion of the photoresist mask 262 may also be stripped prior to step 214.

Figure 12:
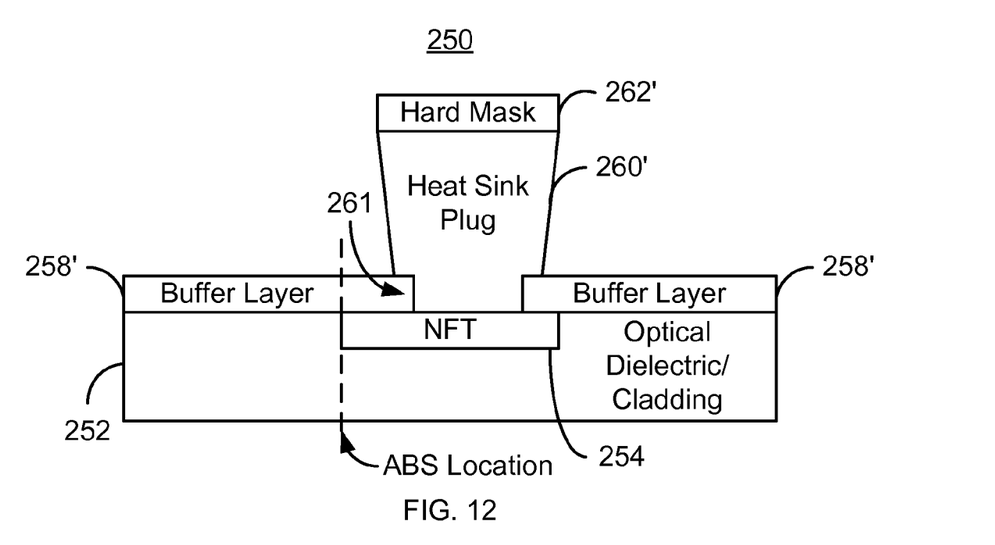

The EAMR transducer is ion milled, via step 214. Thus, an exposed portion of the heat sink layer 260 is removed. The milling in step 214 is thus configured to remove the material(s) used in the heat sink layer. Thus, a heat sink plug is formed. FIG. 12 depicts the EAMR transducer after step 214 is performed. Thus, heat sink plug 260' is shown. A remaining portion of the hard mask 262' is also shown. The ion mill performed in step 214 is configured such that the heat sink plug 260' has either vertical or reentrant sidewalls. The embodiment shown in FIG. 12 has reentrant sidewalls. Thus, the bottom of the heat sink plug 260', adjoining the top of the buffer layer 258' has a smaller width than the top of the heat sink plug 260'. Note that, a portion of the heat sink plug residing above the aperture 259 is wider than the portion of the heat sink plug residing in the aperture 259. Thus, the heat sink plug may be considered to have a "neck" 261. For simplicity, the neck 261 is only denoted in FIG. 12.

Figure 13:
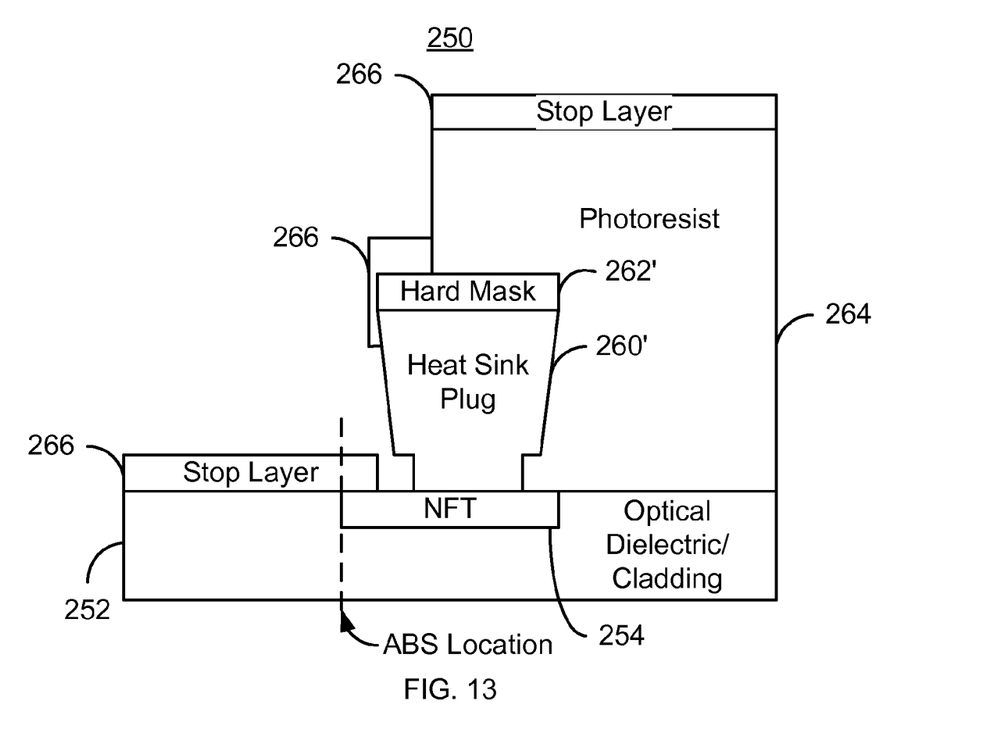

A remaining portion of the buffer layer 258' is removed using a wet etch, via step 216. Thus, a Cr, Ru, and/or NiFe wet etch may be used in step 216. A photoresist layer that covers a portion of the heat sink plug 260' distal from the ABS location is provided, via 218. Photolithography may be used in step 216. A stop layer is also deposited on the EAMR transducer, via step 220. The stop layer may be blanket deposited in step 220. FIG. 13 depicts the EAMR transducer after step 220 is performed. Thus, the stop layer 266 is shown. The stop layer may include NiFe, Ru, and/or Cr. Because of the underlying topology, the stop layer 266 is actually separated into multiple portions. One covers the front of the NFT 266 and cladding 252, one covers a portion of the hard mask 262 and side of the heat sink plug 260', and one covers the photoresist layer 264.

Figure 14:
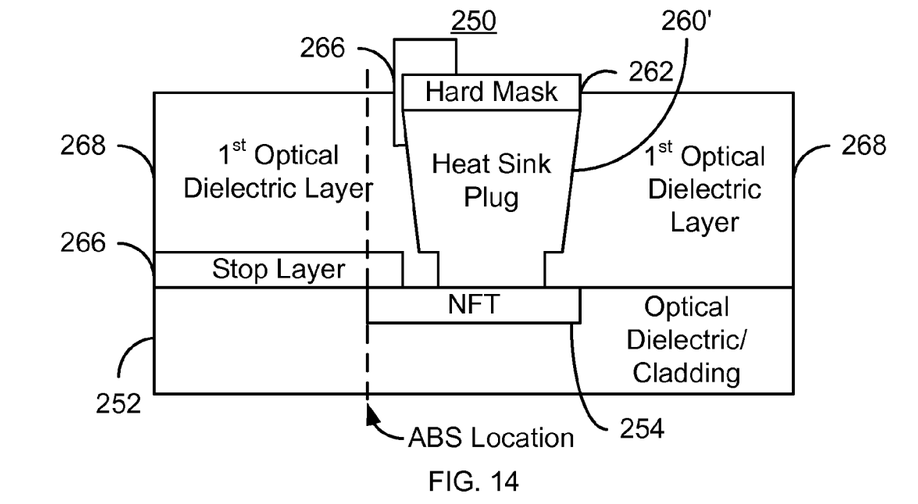

The photoresist layer is removed, for example using a lift-off process, via step 252. A first optical dielectric is deposited, via step 224. In some embodiments, a chemical mechanical planarization (CMP) may also be performed in step 224. The optical dielectric might include material such as one or more of aluminum oxide, silicon oxide, GaN, and BeO. FIG. 14 depicts the EAMR transducer 250 after step 224 is performed. Thus, first optical dielectric material 268 is shown. As can be seen in FIG. 14, the first optical dielectric layer 268 refills the region around the heat sink plug 260', but may not cover the heat sink plug 260'. Further, the surface of the optical dielectric 268 may be substantially flat due to the CMP performed in step 224.

Figure 15:
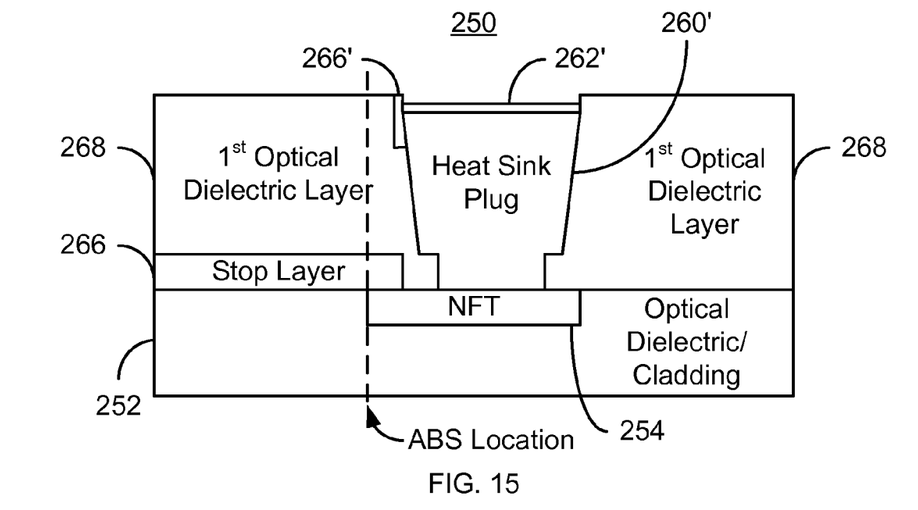

A portion of the stop player 266 and the hard mask are removed, via step 226. In some embodiments, the step 226 is accomplished using one or more RIEs. For example, a Cr RIE may be performed to remove the stop layer, while a SiC RIE is performed to remove the hard mask 262. In other embodiments, other mechanisms, such as a wet etch, may be used. FIG. 15 depicts the EAMR transducer after step 226 is performed. Thus, the stop layer 266 on the heat sink plug 260' has been removed. However, a portion 266' at the sides of the heat sink plug 260' may remain. In addition, the hard mask 262 may be removed. In the embodiment shown, however, a thin layer 262' remains. The thin layer 262' of the hard mask remaining may be an underlying Cr or analogous layer.

Figure 16:
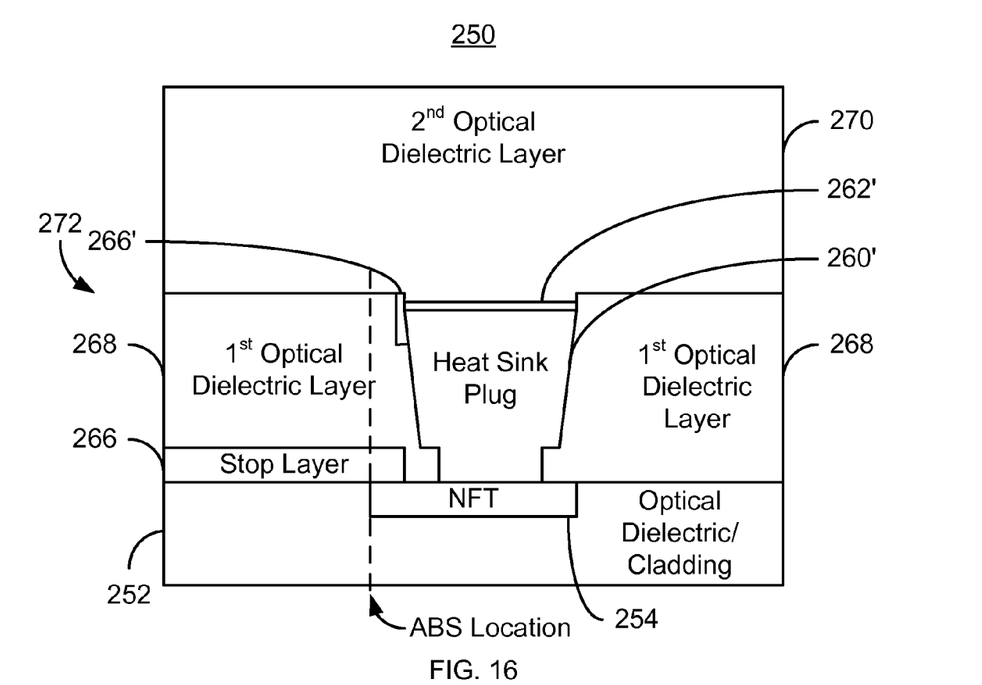

A second optical dielectric is deposited, via step 228. The first and second optical dielectrics forming an optical dielectric structure covering the stop layer 266/266', the heat sink plug 260', and the NFT 254. The second optical dielectric might include material such as one or more of aluminum oxide, silicon oxide, GaN, and BeO. FIG. 16 depicts the transducer 250 after step 228 is performed. Thus, second optical dielectric layer 270 is shown. In some embodiments, the second optical dielectric layer 270 is composed of the same materials as the first optical dielectric material 268. Together, the optical dielectric layers 268 and 270 form dielectric structure 272. The height of the second optical dielectric layer 270 may depend upon the slope of the heat sink and the distance desired between the pole (not shown) and the NFT 254 and other optics (not shown).

Figure 17:
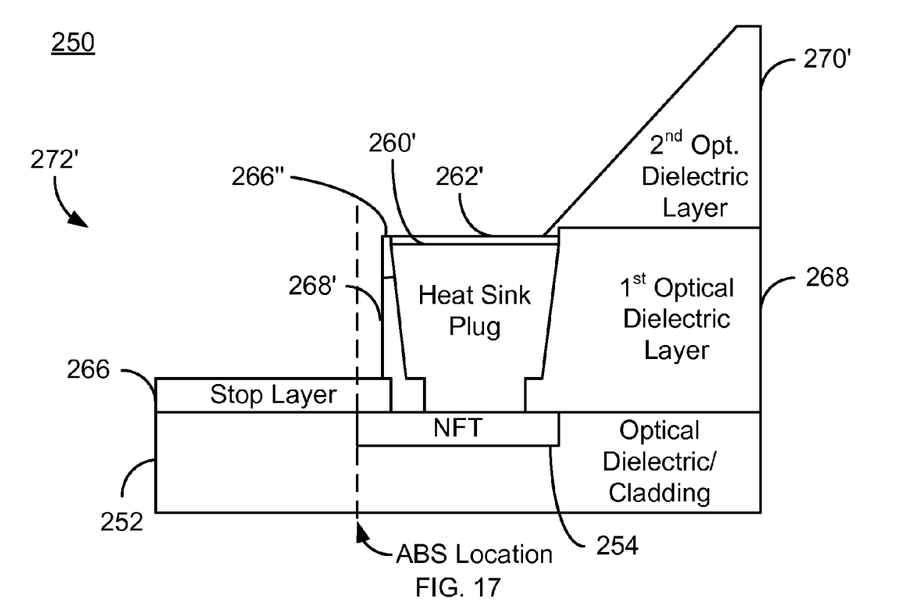

An angle is formed in the optical dielectric structure, via step 230. The angle is such that the portion of the optical dielectric structure 272 closer to the ABS is thinner than a portion of the optical dielectric structure 272 distal from the ABS. In some embodiments, this is accomplished by an anisotropic RIE, an ion mill, or other procedure. For example, a portion of the second optical dielectric material 270 may be masked. Thus, the portion of the second optical dielectric material 270 near the ABS is exposed. An anisotropic removal process may then be applied to achieve the desired shape of the dielectric structure 272. FIG. 17 depicts the transducer 110 after step 230 is performed. Thus, much of the dielectric structure 272' has been removed. Only a sloped portion of the second dielectric layer 270' remains. Similarly, although the first dielectric material 268 distal from the ABS location remains intact, much of the first dielectric layer proximate to the ABS has been removed. However, a small portion 268' remains on the side of the heat sink plug 260'.

Figure 18:
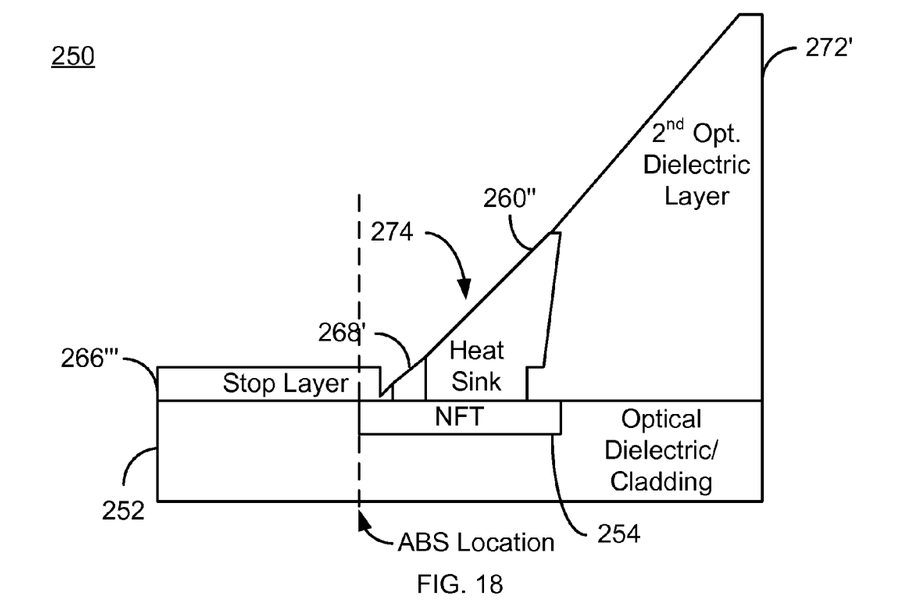

The EAMR transducer is then ion milled to remove a portion of the heat sink plug and expose a top, sloped surface of the heat sink, via step 232. The ion mill may be at an angle of forty-five degrees from perpendicular to the ABS. However, in other embodiments, the angle is greater than zero and less than ninety degrees. In either embodiment, however, milling angle is close to the angle made by the optical dielectric structure 270 shown in FIG. 17. FIG. 18 depicts the EAMR transducer 250 after step 232 is performed. Thus, the sloped surface 274 of the heat sink 260'' is formed. A portion of the stop layer has also been removed, leaving stop layer 266''.

Figure 19:
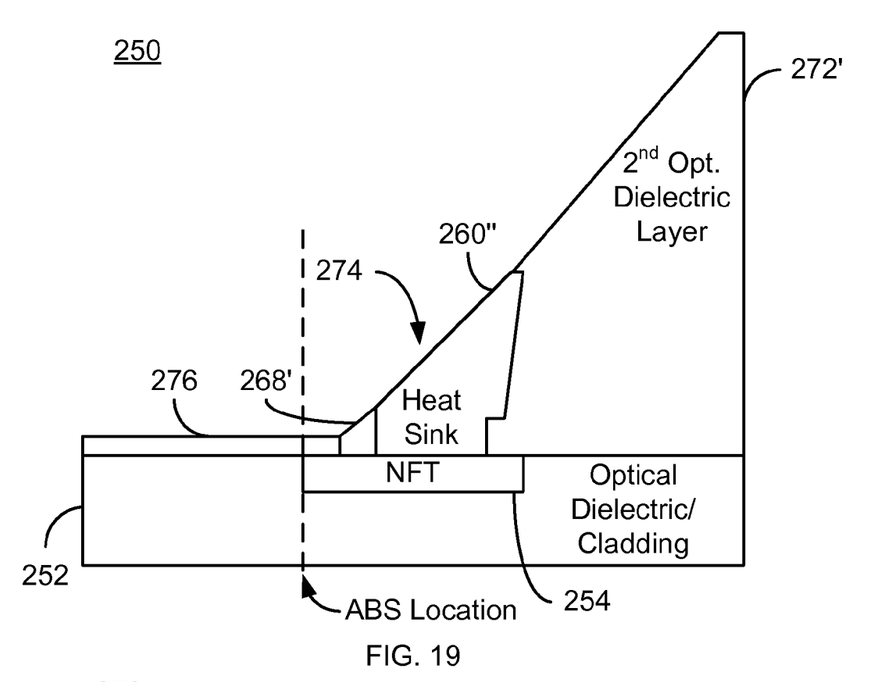

A wet etch may then be performed to remove the stop layer 266''', via step 234. In addition, a dielectric may be used to refill a portion of the EAMR transducer 250. FIG. 19 depicts the EAMR transducer after step 234. Thus, the stop layer 266''' has been removed. Instead, dielectric layer 276 has optionally been provided.

Figure 20:
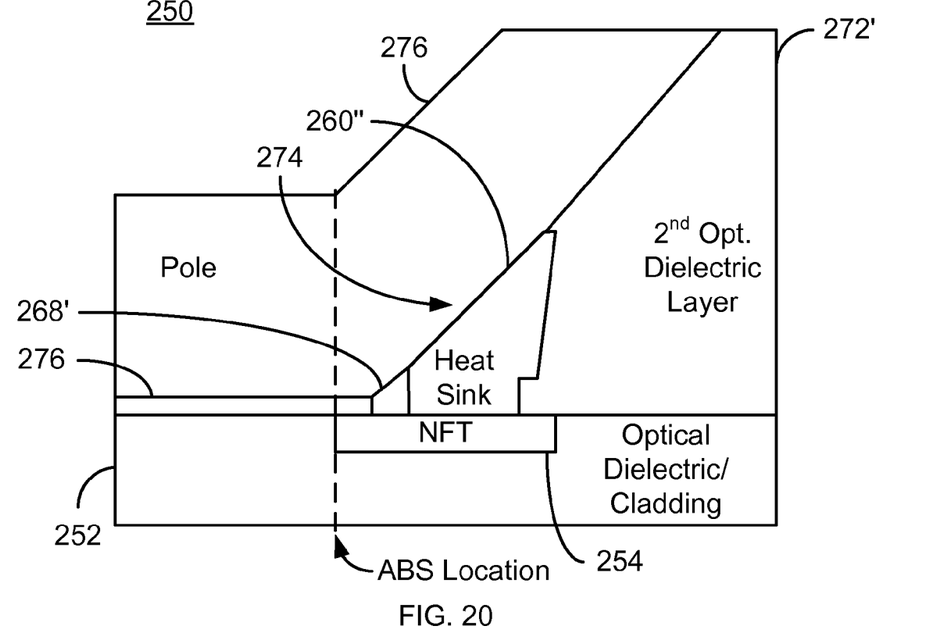

A write pole is provided, via step 236. The write pole is configured to write to a region of the media. Step 236 may include plating or otherwise depositing high saturation magnetization materials. FIG. 20 depicts the EAMR transducer 250 after step 236 is performed. Thus, the write pole 276 is shown. The write pole 276 bottom surface shares an interface with the heat sink 260''. Thus, the bottom surface of the write pole 276 has a slope corresponding to the angle of the heat sink 260''' and adjoins the top surface of the heat sink. One or more write coils may be provided for energizing the pole. Fabrication of the EAMR transducer 250 may then be completed.

Thus, using the method 200, the EAMR transducer 250 may be fabricated. The PMR transducer EAMR has the desired geometry and heat dissipation. The method 200 and EAMR transducer 250 share the benefits of the method 100 and the EAMR transducer 250. Consequently, manufacturing and performance of the transducer 250 has been improved.

We claim:
1. A method for providing an energy assisted magnetic recording (EAMR) transducer coupled with a laser for providing energy and having an air-bearing surface (ABS) configured to reside in proximity to a media during use, the EAMR transducer including a near field transducer (NFT)

proximate to the ABS for focusing the energy onto the region of the media, the method comprising:

providing a heat sink having a bottom thermally coupled with the NFT and a top surface at an angle with respect to the ABS, the angle being greater than zero and less than ninety degrees, the heat sink having a lower portion including the bottom and an upper portion including the top, the lower portion of the heat sink having at least a first width smaller than at least a second width of the upper portion of the heat sink;

providing a write pole configured to write to a region of the media, the write pole having a bottom surface thermally coupled with the top surface of the heat sink; and providing at least one coil for energizing the write pole.

2. A method for providing an energy assisted magnetic recording (EAMR) transducer coupled with a laser for providing energy and having an air-bearing surface (ABS) configured to reside in proximity to a media during use, the EAMR transducer including a near field transducer (NFT) proximate to the ABS for focusing the energy onto the region of the media, the method comprising:

providing a heat sink having a bottom thermally coupled with the NFT and a top surface at an angle with respect to the ABS, the angle being greater than zero and less than ninety degrees, wherein the step of providing the heat sink further includes forming a buffer layer having an aperture therein, the aperture residing above a portion of the NFT;

providing a heat sink plug, a portion of the heat sink plug residing above the aperture and having sidewalls that are reentrant or substantially vertical;

refilling an optical dielectric layer, the optical dielectric layer covering the heat sink plug;

forming an angle in the optical dielectric layer such that a first portion of the optical dielectric layer closer to the ABS is thinner than a second portion of the optical dielectric layer distal from the ABS; and removing a portion of the heat sink plug to expose the top surface of the heat sink;

providing a write pole configured to write to a region of the media, the write pole having a bottom surface thermally coupled with the top surface of the heat sink; and providing at least one coil for energizing the write pole.

3. The method of claim 2 wherein a lower portion of the heat sink plug residing in the aperture has a first width smaller than a second width of the portion of the heat sink plug above the aperture.

4. The method of claim 2 wherein the NFT has a top substantially perpendicular to the ABS and wherein the step of forming the buffer layer having aperture further includes:
providing a photoresist post on the NFT;
depositing the buffer layer covering the photoresist post and an exposed portion of the NFT;
performing an ion mill at a nonzero angle from the top of the NFT; and
removing the photoresist post to form the aperture.

5. The method of claim 2 wherein the step of providing the heat sink plug further includes:
depositing a heat sink layer, a portion of the heat sink layer residing in the aperture;
providing a mask covering a portion of the heat sink layer above the aperture and having a footprint wider than the aperture; and
removing an exposed portion of the heat sink layer.

6. The method of claim 5 wherein the step of providing the mask further includes:
depositing a hard mask layer on the heat sink layer;

providing a photoresist post on the hard mask layer; and
removing an exposed portion of the hard mask layer to provide a hard mask.

7. The method of claim 5 wherein the step of removing the portion of the heat sink layer further includes:
milling the heat sink layer.

8. The method of claim 5 wherein the heat sink layer include at least one Au and Cu.

9. The method of claim 2 wherein the step of refilling the optical dielectric layer further includes:
removing a remaining portion of the buffer layer;
providing a photoresist layer covering a portion of the heat sink plug distal from the ABS;
depositing a stop layer covering the NFT, the heat sink plug, and the photoresist layer;
removing the photoresist layer;
depositing a first optical dielectric material including at least one of aluminum oxide, silicon oxide, GaN, and BeO;
removing a portion of the stop layer on the heat sink plug; and
depositing a second optical dielectric material including at least one of aluminum oxide, silicon oxide, GaN, and BeO.

10. The method of claim 9 wherein the step of removing a portion of the buffer layer further includes wet etching the buffer layer.

11. The method of claim 10 wherein the stop layer includes at least one of Cr, Ru, and NiFe.

12. The method of claim 10 further comprising:
wet etching the stop layer.

13. The method of claim 2 wherein the step of removing the portion of the heat sink plug further includes:
ion milling the heat sink plug at a milling angle corresponding to the angle.

14. The method of claim 1 wherein the bottom of the pole has a slope corresponding to the angle of the heat sink.

15. The method of claim 1 wherein the bottom of the pole adjoins the top surface of the heat sink.

16. A method for providing an energy assisted magnetic recording (EAMR) transducer coupled with a laser for providing energy and having an air-bearing surface (ABS) configured to reside in proximity to a media during use, the EAMR transducer including a near field transducer (NFT) proximate to the ABS for focusing the energy onto the region of the media, the NFT having a top substantially perpendicular to the ABS and the method comprising:

providing a photoresist post on the NFT;
depositing the buffer layer covering the photoresist post and an exposed portion of the NFT;
performing an ion mill at a nonzero angle from the top of the NFT;
removing the photoresist post to form an aperture in the buffer layer, the aperture residing above a portion of the NFT;
depositing a heat sink layer, a portion of the heat sink layer residing in the aperture;
providing a hard mask covering a portion of the heat sink layer above the aperture, the hard mask being larger than the aperture;
milling an exposed portion of the heat sink layer to form a heat sink plug, a first portion of the heat sink plug residing above the aperture, having a first width, and having sidewalls that are reentrant or substantially vertical, a second portion of the heat sink plug residing in the aperture and having a second width less than the first width;

removing a remaining portion of the buffer layer using a wet etch;
providing a photoresist layer covering a portion of the heat sink plug distal from the ABS;
depositing a stop layer covering the NFT, the heat sink plug, and the photoresist layer;
removing the photoresist layer;
depositing a first optical dielectric;
removing a portion of the stop layer on the heat sink plug using a stop layer wet etch;
depositing a second optical dielectric, the first and second optical dielectrics forming an optical dielectric structure covering the stop layer, the heat sink plug, and the NFT;
forming an angle in the optical dielectric structure such that a first portion of the optical dielectric structure closer to the ABS is thinner than a second portion of the optical dielectric structure distal from the ABS;
ion milling the heat sink plug to form a heat sink having a bottom thermally coupled with the NFT and a top surface at an angle with respect to the ABS, the angle being greater than zero and less than ninety degrees;
providing a write pole configured to write to a region of the media, the write pole having a bottom surface having a slope corresponding to the angle of the heat sink and adjoining the top surface of the heat sink; and
providing at least one coil for energizing the write pole.

* * * * *